(12) United States Patent
Alhazme (10) Patent No.: US 9,471,817 B1
(45) Date of Patent: Oct. 18, 2016

(54) ACTION-TRIGGERED RADIO-FREQUENCY IDENTIFICATION TAG

(71) Applicant: Raed H. Alhazme, Northampton, PA (US)

(72) Inventor: Raed H. Alhazme, Northampton, PA (US)

(*) Notice: Subject to any disclaimer, the term of this patent is extended or adjusted under 35 U.S.C. 154(b) by 0 days.

(21) Appl. No.: 14/794,917

(22) Filed: Jul. 9, 2015

(51) Int. Cl.
*H04Q 5/22* (2006.01)
*G06K 7/10* (2006.01)

(52) U.S. Cl.
CPC ................................. *G06K 7/10158* (2013.01)

(58) Field of Classification Search
CPC .................................................... G06K 7/10158
USPC ............. 340/10.3, 10.34, 572.1, 572.8, 10.1, 340/5.61, 10.51, 568.2
See application file for complete search history.

(56) References Cited

U.S. PATENT DOCUMENTS

| | | | |
|---|---|---|---|
| 7,541,916 B2 | 6/2009 | Choi et al. | |
| 8,013,744 B2 | 9/2011 | Tsai et al. | |
| 8,451,098 B2* | 5/2013 | Posamentier | G06K 19/0723 340/10.1 |
| 2013/0033364 A1* | 2/2013 | Raz | G06K 19/0716 340/10.1 |

FOREIGN PATENT DOCUMENTS

| | | |
|---|---|---|
| CN | 202904635 U | 4/2013 |
| JP | 2006-195502 A | 7/2006 |
| JP | 2007-271401 A | 10/2007 |

* cited by examiner

*Primary Examiner* — Dhaval Patel
(74) *Attorney, Agent, or Firm* — Oblon, McClelland, Maier & Neustadt, L.L.P.

(57) ABSTRACT

A radio-frequency identification (RFID) system includes at least one tag having tag circuitry configured to detect activation of a trigger switch resulting from a specific trigger action, provide electrical power to the tag circuitry when the specific trigger action is performed, and transmit an identification data signal for the at least one tag when the trigger switch is activated and in response to receiving an interrogator signal. An enclosure surrounds the tag circuitry including a separating end detachably attached to a primary end where the specific trigger action is the separation of the separating end from the primary end. A RFID reader has reader circuitry to determine that the at least one tag is unarmed, armed, or triggered based on a presence or absence of the identification data signal and the presence or absence of the tag identification data on an armed tag list.

20 Claims, 6 Drawing Sheets

ACTION-TRIGGERED RADIO-FREQUENCY IDENTIFICATION TAG

GRANT OF NON-EXCLUSIVE RIGHT

This application was prepared with financial support from the Saudia Arabian Cultural Mission, and in consideration therefore the present inventor has granted The Kingdom of Saudi Arabia a non-exclusive right to practice the present invention.

BACKGROUND

In conventional RFID systems of the related art, tags are attached to objects to be identified, and a reader transmits an interrogator signal to the tag and reads a response from the tag. RFID tags can be either passive, active, or battery-assisted passive. An active tag has an on-board battery and periodically transmits its ID signal. A battery-assisted passive tag has a small battery on board and is activated when in the presence of an RFID reader. A passive tag uses radio energy transmitted by the RFID reader to become active and transmit its ID signal.

RFID tags are used in many industries for tracking objects. For example, RFID tags attached to pharmaceuticals can be tracked through warehouses.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to one aspect of the present disclosure, a radio-frequency identification (RFID) tag is provided. The RFID tag includes: an antenna that transmits radio-frequency waves; a radio-frequency transmitter that is coupled to the antenna and generates radio-frequency waves to be transmitted from the antenna according to a input signal; a microcontroller that is connected to the radio-frequency transmitter and generates a signal to be inputted to the radio-frequency transmitter, the signal including tag identification data; a trigger switch coupled to the microcontroller so as to interrupt power supply to the microcontroller until the trigger switch is triggered by a specific trigger action; and an enclosure that encloses the antenna, the radio-frequency transmitter, the microcontroller, and the trigger switch, the enclosure being configured so as to allow the trigger switch to be triggered by the specific trigger action, wherein, when the specific trigger action is applied, the trigger switch is triggered and allows the microcontroller to receive power supply, and upon receiving the power supply, the microcontroller sends the signal to the radio-frequency transmitter to enable the radio-frequency transmitter to transmit a radio-frequency wave from the antenna to send the tag identification data.

According to another aspect of the present disclosure, a RFID system is provided. The RFID system includes a plurality of the foregoing RFID tags and a reader that transmits interrogator signals to the plurality of RFID tags and receives tag identification data returned in response to the interrogator signals. The reader further includes a network controller for communicating with a network, and, when the reader receives tag identification data, the reader transmits a detection signal to a predetermined destination via the network, the detection signal being indicative of the tag identification data received and occurrence of the specific trigger action corresponding to a type of the trigger switch of the RFID tag that returned the tag identification data.

According to another aspect of the present disclosure, a method for registering and monitoring a tag in a RFID system using a reader is provided. The method includes: receiving tag identification data returned in response to an interrogator signal; determining whether or not received tag identification data corresponds to a tag included in an armed tag list, the armed tag list being a list of tags that is armed; informing a user that a tag is ready to arm in a case where the received tag identification data dose not corresponds to any tag included in the armed tag list; and outputting a detection signal to a predetermined destination via a network in a case where the received tag identification data corresponds to a tag included in the armed tag list, wherein the tag is provided with an arming section that allows a user to arm the tag and is triggered by a specific action matched to a type of the tag, and the tag returns tag identification data before armed and triggered, returns no tag identification data after being armed and before being triggered, and returns the tag identification when triggered.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Conventional RFID tags of the related art either constantly send the ID through radio-frequency waves or are stimulated to send the ID by magnetic fields of interrogator signals transmitted from an RFID reader. However, transmission of the ID does not link to a specific mechanical or chemical condition of the tag and an associated object to which the tag is affixed.

For example, if the usage of medications and medical consumables in a medical procedure is monitored, there may not be a way to configure any of the previously mentioned conventional RFID tag types to send the ID when a tagged medication bottle or consumable bag is opened.

Another issue regarding the conventional RFID tags is that a large amount of power may be wasted by covering an intended area with a RFID magnetic field until an event occurs, such as moving or picking up a tagged object.

The present inventor recognizes the foregoing issues relating to the conventional RFID tags of the related art and the need to provide a RFID tag that can be triggered by a corresponding specific trigger action. Here, the specific trigger action is one of actions that may be applied to the RFID tag that is attached to a target object when a monitored event occurs.

In one embodiment, a RFID tag includes a trigger switch that interrupts electrical power from being supplied to RFID tag circuitry until the trigger switch is triggered by a specific trigger action, and an enclosure of the RFID tag is configured to allow the trigger switch to be triggered by the specific trigger action. When the specific trigger action occurs, the trigger switch is triggered and allows the RFID tag circuitry to receive electrical power. Upon receiving the electrical power, the RFID tag sends the ID to a RFID reader, thereby informing the RFID reader of an occurrence of the specific trigger action at the RFID tag corresponding to the tag ID transmitted to the RFID reader from the RFID tag.

For example, in a case where the RFID tag is attached to a medicine bottle to seal a cap, an event of opening a medicine bottle cap may be detected by detecting separation of part of the RFID tag. Here, an enclosure of the RFID tag is configured so that part of the enclosure can be separated from the RFID tag by external force that is applied when the medicine bottle cap is being opened. Further, when the part of enclosure of the RFID tag is separated, the RFID tag is triggered and transmits tag identification data to the RFID reader. By receiving such tag identification data, the event of opening the medicine bottle cap may be detected.

The specific trigger action may be a physical or chemical action that occurs on the RFID tag and/or the target object to which the RFID tag is affixed. Physical or mechanical actions may include bending, pressurizing, breaking, and/or unpeeling the RFID tags. Chemical actions may include exposing or submerging a part or all of the RFID tag in a chemical substance, such as water, or chemical solution, such as sodium chloride and water.

Unlike the conventional RFID tags, the RFID tags described herein do not send the tag identification data until a matching physical or chemical action is applied thereto. This solution may be ideal for tracking parts and consumables when they are unpacked, especially in healthcare settings.

The RFID tag according to this embodiment is useful for healthcare safety so that medication and consumables having expiration dates can be monitored. A date of opening a bottle can be detected by the RFID tag and may be compared with an expiration date of the contents of the bottle. If it is found that the bottle is opened after the expiration date, a healthcare provider may be notified.

The RFID tag according to the present disclosure enables power-efficient tracking of movement of tagged components. For example, the RFID tag may be attached to a target object and part of a shelf on which the target object is stored. When the target object is moved, the RFID tag is separated and a trigger event occurs. Once the RFID tag is triggered, the RFID tag operates in a way corresponding to RFID tags of the related art. According to certain embodiments, the RFID tag may consume power only after the specific trigger action occurs.

Referring now to the drawings, wherein like reference numerals designate identical or corresponding parts throughout the several views.

Figure 1:
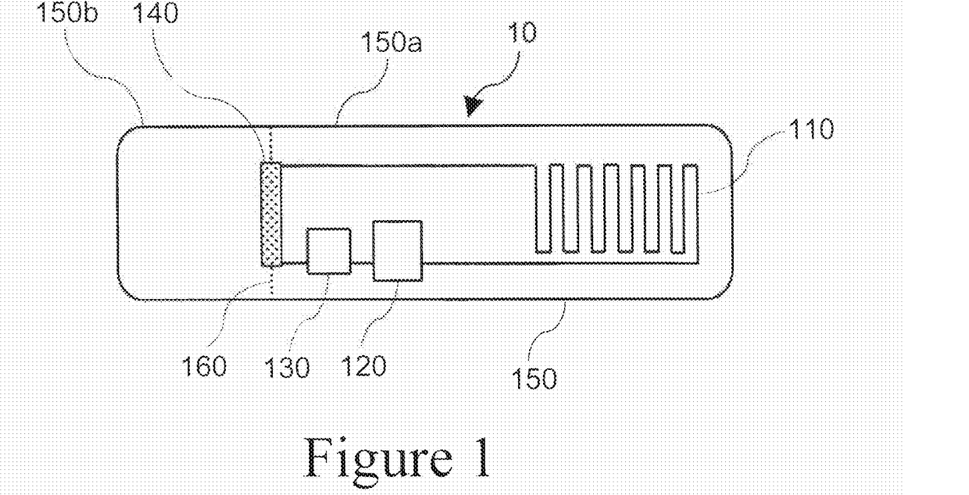
FIG. 1 is a schematic diagram of a tag according to one example.

A RFID tag according to a first embodiment is described with reference to FIG. 1 and FIG. 2. In FIG. 1, in one implementation, a tag 10 includes an antenna 110, a radio-frequency (RF) transmitter 120, a microcontroller 130, the trigger switch 140, and the enclosure 150. In addition, the antenna 110, RF transmitter 120, microcontroller 130, and the trigger switch 140 can interchangeably be referred to as RFID tag circuitry throughout the disclosure.

The tag 10 is a passive type RFID tag that returns tag identification data (tag ID) in response to an interrogator signal received from a RFID reader (not shown) when a specific action matched to a type of the trigger switch 140 is applied to the tag 10. The tag 10 includes the trigger switch 140 that interrupts electrical power to the RFID tag circuitry until the trigger switch 140 is triggered by the specific trigger action. The enclosure 150 is configured to allow the trigger switch 140 to be triggered by the specific trigger action.

The antenna 110 transmits RF waves generated by the RF transmitter 120. The antenna 110 also receives interrogator signals from the RFID reader to obtain power to activate the RF transmitter 120 and the microcontroller 130. The antenna 110 may be formed from an electrically conducting wire or a conductor pattern formed on a dielectric substrate as depicted in FIG. 1. For example, the antenna 110 may be printed, etched, stamped, or vapor-deposited onto a mount such as a paper substrate or polyethylene terephthalate (PET). The shape of the antenna 110 is not limited to the one depicted in FIG. 1, and the antenna 110 may alternatively be, for example, a coil, loop, spiral, patch, or dipole antenna.

The radio-frequency transmitter 120 is coupled to the antenna 110 and generates radio-frequency waves to be transmitted from the antenna 110. The radio-frequency waves are modulated according to an input signal from the microcontroller 130.

The microcontroller 130 is coupled to the radio-frequency transmitter 120, and sends a signal to the radio-frequency transmitter 120 to enable the radio-frequency transmitter 120 to transmit radio-frequency waves from the antenna 110 to return the tag ID in response to interrogator signals in a case where the microcontroller 130 is activated by receiving power via the trigger switch 140. The microcontroller 130 may include, for example, a processor core, memory, and programmable input/output peripherals. The microcontroller 130 may encode the signal before sending it to the radio-frequency transmitter 120 to increase security level. The processor core includes a programmed processor as a processor includes circuitry. A processing circuit/circuitry may also include devices such as an application specific integrated circuit (ASIC) and conventional circuitry components arranged to perform the recited functions.

The trigger switch 140 is coupled to the microcontroller 130 so as to interrupt the supply of electrical power to the microcontroller 130 prior to the occurrence of a trigger event. The tag 10 may not respond to the interrogator signals until the specific trigger action activates the trigger switch 140. The trigger switch 140 is interposed between an electrical power source for the microcontroller 130 and a power input port of the microcontroller 130 that receives power. In this case, the power source is the antenna 110 since the tag 10 is the passive type RFID tag that receives power from the antenna 110 when an interrogator signal is received from the RFID reader. The trigger switch 140 is activated or turned on when a specific action that matches the structure of the trigger switch 140 is applied to the enclosure 150. When the trigger switch 140 is activated, the microcontroller 130 can receive electrical power.

In one embodiment, the specific trigger action that triggers the trigger switch 140 is separation of the tag 10.

The trigger switch 140 is composed of two electrodes and an electrical isolation member interposed therebetween. The electrical isolation member is made of insulating material and electrically isolates the two electrodes. The two electrodes may be made of any electrical conductor. One of the two electrodes is coupled to the microcontroller 130, and the other is coupled to the antenna 110. The two electrodes are enclosed inside the enclosure 150 so as to exert pressing force against each other.

According to such a configuration, when the enclosure 150 is separated during the specific trigger action, the electrical isolation member is removed by a separation movement, and the two electrodes make contact with each other due to a pressing force against each other.

The enclosure 150 surrounds the antenna 110, the RF transmitter 120, the microcontroller 130, and the trigger switch 140 to provide a cover and protect constituting elements of the tag 10. The enclosure 150 may be formed of a flexible plastic material. The enclosure 150 is configured in such a way that the enclosure 150 can be separated at a tear-line 160 into a primary enclosure portion 150a and a separating enclosure portion 150b when external force is applied to the enclosure 150.

The antenna 110, the RF transmitter 120, the microcontroller 130, and the two electrodes of the trigger switch 140 are enclosed in the primary enclosure portion 150a whereas the electrical isolation member of the trigger switch 140 is connected to and moves together with the separating enclosure portion 150b.

The tear-line 160 facilitates separation of the enclosure 150 into the primary enclosure portion 150a and the separating enclosure portion 150b, and may be, for example, perforations, notches, or cuts formed on the enclosure 150. Alternatively, the two enclosure portions 150a and 150b may be attached together in a removable manner by adhesive or the like at the tear-line 160.

Figure 2:
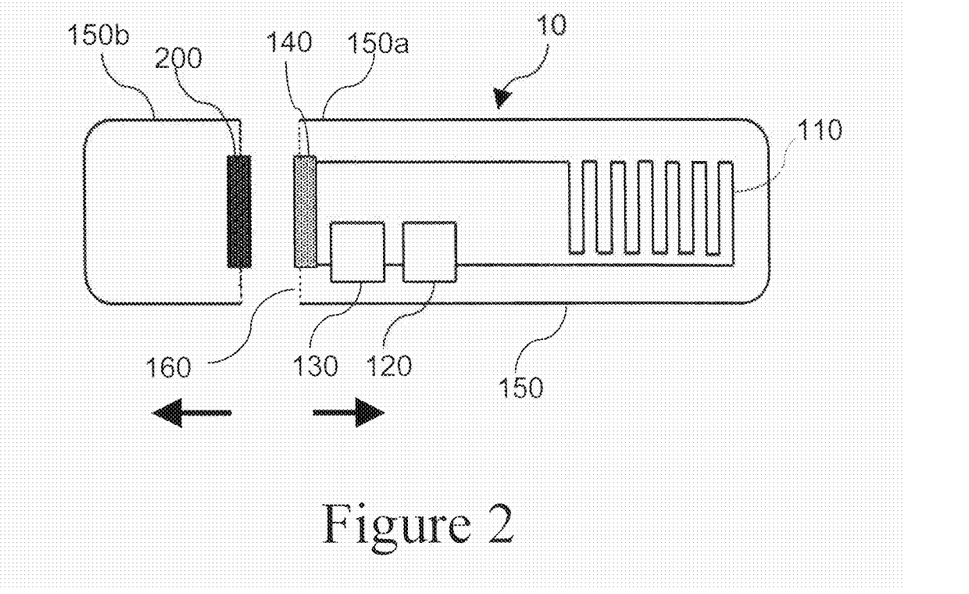
FIG. 2 is a view depicting the tag according to one example triggered by a specific trigger action.

FIG. 2 depicts one type of the tag 10 that is triggered by separation of the enclosure 150. The tag 10 of the present embodiment may be used for an application where the tag 10 is used to seal a target object such as, for example, a medication bottle or a consumable bag, and the tag 10 is used to detect opening of the target object.

When the target object sealed by the tag 10 is opened, the tag 10 is cut and the enclosure 150 is separated at the tear-line 160, which facilitates the separation of the enclosure. At the time of the separation, the electrical isolation member 200 connected to the separating enclosure portion 150b is pulled out from the trigger switch 140, allowing the two electrodes to come in contact with each other. The trigger switch 140 is activated and allows the microcontroller 130 to receive the power when the an interrogator signal is received by the antenna 110.

The electrical isolation member 200 may be, for example, a plate-like member made of an insulating material or an electrical isolation filament. The trigger switch 140 may be configured so that the two electrodes are exert a pressing force against each other on either side of the electrical isolation member 200 to ensure electrical conduction between the two electrodes after the electrical isolation member 200 is removed.

In the present embodiment, the enclosure 150 is configured so as to separate the primary enclosure portion 150a and the separating enclosure portion 150b at the tear-line 160. Alternatively, instead of the separating enclosure portion 150b, a removable portion, to which the electrical isolation member 200 is connected, may be attached to the primary enclosure portion 150a at the tear-line 160 in such a way that the attached removable portion can be easily separated when external force is applied thereto.

The foregoing trigger switch 140 of the tag 10 according to the first embodiment may be configured in a variety of ways.

Figure 3:
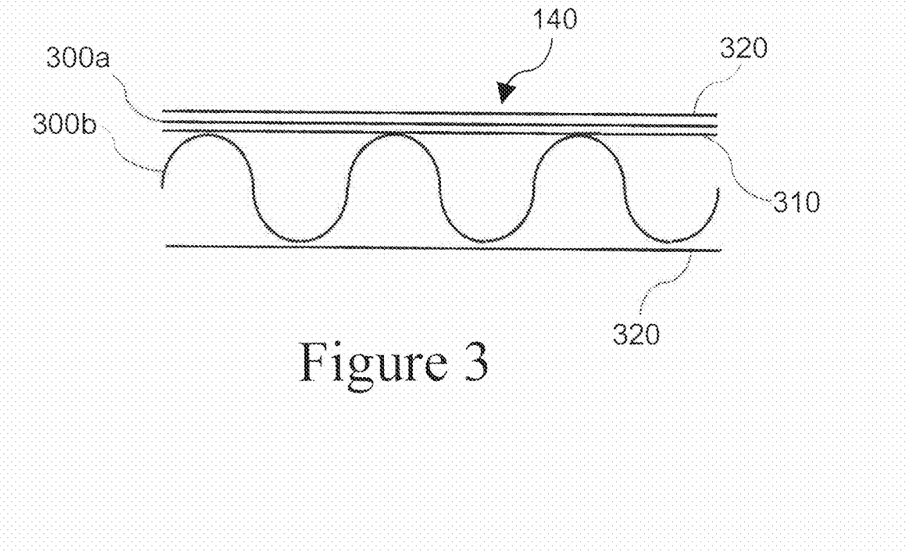
FIG. 3 is a schematic cross-sectional view of an exemplary trigger switch of the tag.

FIG. 3 depicts a schematic cross-sectional view of one example of the trigger switch 140. In FIG. 3, the trigger switch 140 includes positive and negative electrodes 300a and 300b and an electrical isolation filament 310 that isolates the positive and negative electrodes 300a and 300b until the specific trigger action is applied. The trigger switch 140 is placed inside a casing 320, and the casing 320 is enclosed in the enclosure 150. The casing 320 is configured to not stop or interfere with a separation movement of the electrical isolation filament 310.

When the tag 10 is cut on the tear-line 160 because, for example, a medication bottle sealed by the tag 10 is opened, the electrical isolation filament 310 is pulled by one side of the tag 10 as depicted in FIG. 2 together with the separating enclosure portion 150b, causing the positive and negative electrodes 300a and 300b come in contact with each other and complete the circuit.

In this example, one of the positive and negative electrodes 300a and 300b is formed into a wave-like shape and enclosed in the enclosure 320 so as to exert pressing force toward the other electrode 300a across the electrical isolation filament 310. This configuration ensures the connection of the positive and negative electrodes 300a and 300b after the electrical isolation filament 310 is pulled away.

In this example, the trigger switch 140 is triggered by the separation of the tag 10. Alternatively, the trigger switch 140 may be configured so as to be triggered when a portion of the tag 10 is torn off.

In this example, the trigger switch 140 is configured to be activated by a physical or mechanical action. Alternatively, a chemical action may be used to activate the trigger switch 140. For example, the enclosure 150 may include an opening that allows the electrical isolation filament 310 to be exposed to an external environment, and the electrical isolation filament 310 may be made of a material that is dissolved by a specific chemical material. When the specific chemical material is present in an external environment of the tag 10 or a target object to which the tag 10 is attached is placed at an environment containing the specific chemical material, the electrical isolation filament 310 dissolves and is removed from between the two electrodes, thereby activating the trigger switch 140.

Figure 4A:
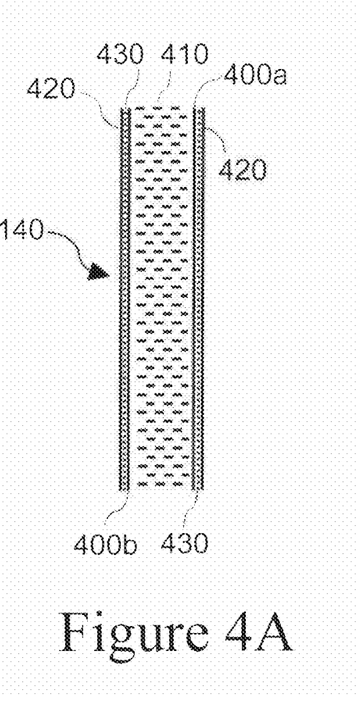
FIG. 4A is a schematic cross-sectional view of another exemplary trigger switch of the tag.
Figure 4B:
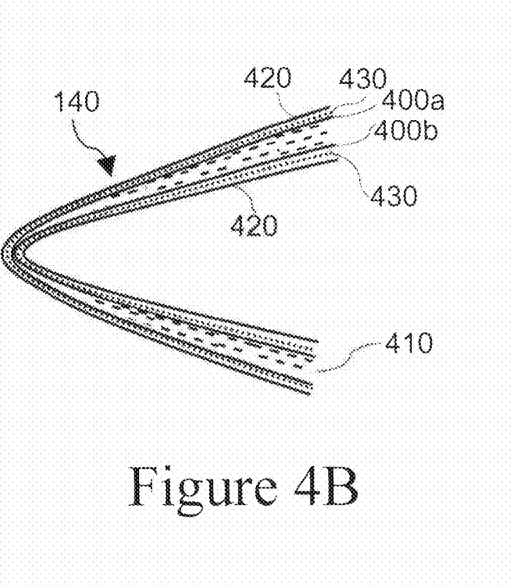
FIG. 4B is a view depicting the trigger switch triggered by a specific trigger action.

FIG. 4A depicts a schematic cross-sectional view of another example of the foregoing trigger switch 140 of the tag 10 according to the first embodiment, and FIG. 4B depicts the trigger switch 140 triggered by a bending action.

In FIG. 4A, the trigger switch 140 is composed of a flat, pouch-like container 420 filled with an electrical isolation fluid such as transformer oil or the like. Two electrodes 400a and 400b of the trigger switch 140 are attached to back surfaces of two principal surfaces of the container 420 by adhesive 430.

When the tag 10 is bent as depicted in FIG. 4B, the electrical isolation fluid is pushed away from an apex or a ridge of a bent portion until the two electrodes 400a and 400b make contact with each other without having the electrical isolation fluid in between the two electrodes 400a and 400b. This bending action activates the trigger switch 140 and allows the tag 10 to operate in a manner as described previously with respect to FIGS. 1 and 2.

The trigger switch 140 of this example may alternatively be activated by a pressurization action. For example, the trigger switch 140 may be arranged in the enclosure 150 so as to be able to receive pressurization actions directly or indirectly. The tag 10 may be adjusted to one or more predetermined pressure set-points by modifying the quantity and/or quality of the electrical isolation fluid or by modifying the container 420.

Figure 5:
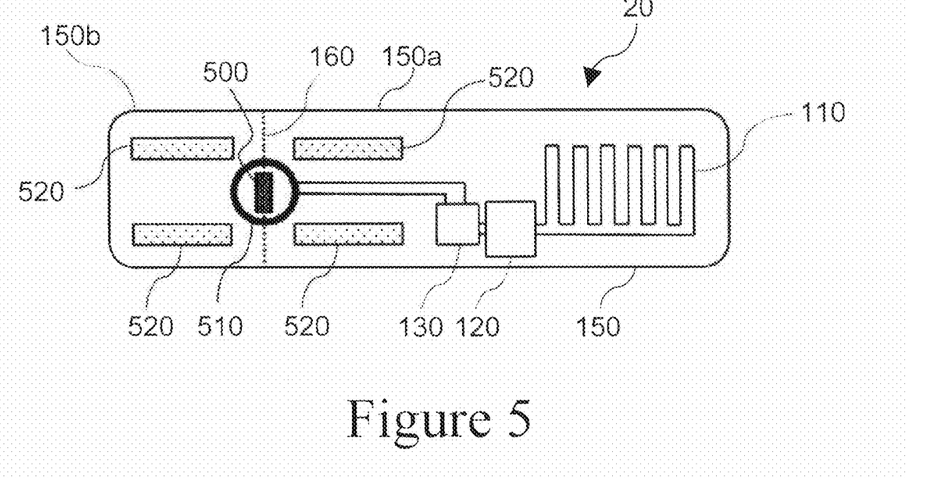
FIG. 5 is a schematic diagram of a tag according to one example.

A RFID tag according to the second embodiment is described with reference to FIG. 5. In FIG. 5, a tag 20 according to the present embodiment shares common elements with the foregoing tag 10 depicted in FIG. 1, such as the antenna 110, the RF transmitter 120, the microcontroller 130, and the enclosure 150, and the common elements operate the same way as described in the first embodiment. However, the tag 20 differs from the tag 10 depicted in FIG. 1 in that the tag 20 is powered through electromagnetic induction using a magnet 500 surrounded by a coil 510 and also includes adhesive tape portions 520 for securely affixing the tag 20 to the target object.

In the present embodiment, the magnet 500 and the coil 510 function both as the trigger switch to be activated by a specific trigger action and as a power source for circuitry. Specifically, the coil 510 is enclosed in the primary enclosure portion 150a together with the RFID tag circuitry and is connected to power lines of the microcontroller 130. The magnet 500 is connected to the separating enclosure portion 150b and arranged so as to be placed at a middle of the coil 510 while the primary enclosure portion 150a and the separating enclosure portion 150b are connected and before the specific trigger action is applied. Without movement of the coil 510 and magnet 500 from a specific trigger action, no current is induced in the coil 510, and no power is supplied to the microcontroller 130.

In one example, the specific trigger action associated with the tag 20 is a separation action of the separating enclosure portion 150b from the primary enclosure portion 150a. The tag 20 may be attached on an object that has two movable parts, such as a door, a folder, or a book. The enclosure portion 150a on a first side of the tear-line 160 may be attached to one moving part, and the enclosure portion 150b on a second side of the tear-line 160 may be attached to the other moving part of the object.

A mechanical action that involves moving the parts of the object activates an electrical generator, through electromagnetic induction resulting from movement of the magnet 500 relative to the coil 510. The relative motion between the magnet 500 and the coil 510 may generate sufficient power to operate the RFID tag circuitry for transmitting the tag ID to the RFID reader.

According to another example, the tag 20 may send the tag ID as soon as the specific trigger action is applied thereto, without receiving an interrogator signal. The spatial relationship between the magnet 500 and the coil 510 is not limited to the one described in FIG. 5, and may be arbitrarily altered as long as a sufficient power is induced by the electromagnetic induction.

Figure 6:
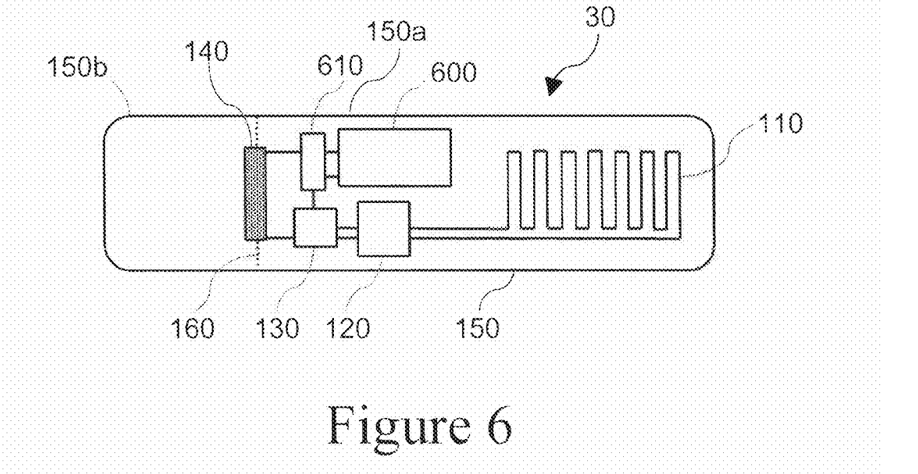
FIG. 6 is a schematic diagram of a tag according to one example.

A RFID tag according to one example is described with reference to FIG. 6. In FIG. 6, a tag 30 according to the present embodiment differs from the tag 10 depicted in FIG. 1 in that the tag 30 is an active type RFID tag including a battery 600 and a power regulator 610 for supplying power to circuitry of the tag 30. In the tag 30, the trigger switch 140 is placed between the power regulator 610 and the microcontroller 130 to control power flow to the microcontroller 130.

According to one example, the operation of the tag 30 may be more reliable due to the battery 600 being a stable power supply. The tag 30 may transmit the tag ID as soon as the specific trigger action is applied thereto, without waiting for an interrogator signal from the RFID reader. In this example, the controller 130 detects the specific trigger action, such as the separation of the trigger switch 140, and enables transmission of the tag ID. Further, unlike conventional active type RFID tags of the related art, the tag 30 consumes no power until the trigger switch 140 is activated by the specific trigger action. Thus, the tag 30 may have a longer lifetime than conventional active type RFID tags.

Figure 7:
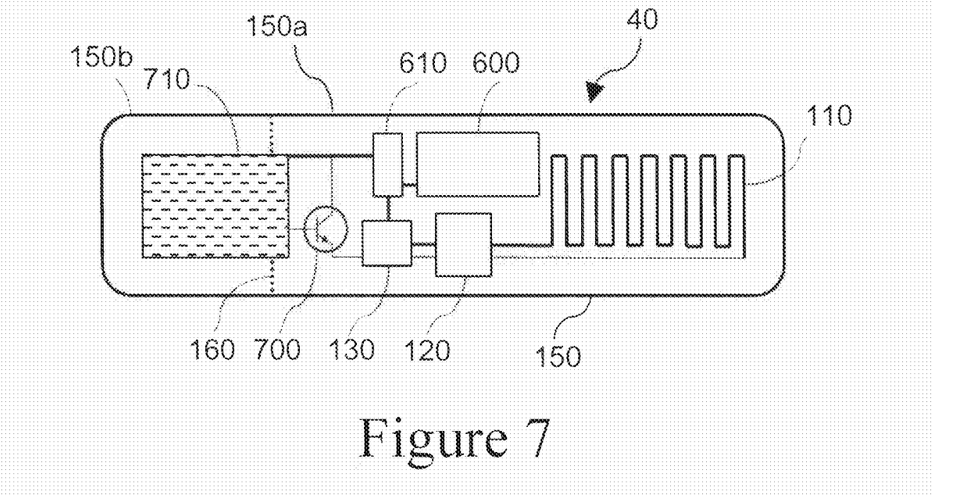
FIG. 7 is a schematic diagram of a tag according to one example.

A RFID tag according to one example is described with reference to FIG. 7. In FIG. 7, a tag 40 according to the present embodiment differs from the tag 30 depicted in FIG. 6 in that the tag 40 includes a transistor 700 and a reducible resistor 710 that function as the trigger switch, which is activated when a predefined part of the tag 40 is torn off.

Specifically, in the tag 40, the transistor 700 is a NPN transistor and is connected to the power regulator 610 at the collector and the microcontroller 130 at the emitter. The reducible resistor 710 is connected to the transistor 700 across the collector and the base.

The reducible resistor 710 includes a removable end that is electrically continuous with the remaining portion of the reducible resistor 710. This removable portion is fixed to the separating enclosure portions 150b, and can be separated from the remaining portion of the reducible resistor 710 that is fixed to the primary enclosure portion 150a when the specific trigger action is applied to the tag 40 at a tear-line 160.

The reducible resistor 710 may be made of a mixture of finely-ground carbon, which is electrically conductive, and an insulating material, such as ceramic. The mixture is held together with a third material, such as resin. The resistance of the reducible resistor 710 can be based on a ratio of quantities and/or resistances of the conductive material and the insulating material.

When the predefined part of the tag 40 is torn off, the resistance of the reducible resistor 710 is reduced, which increases a current on the base of the transistor 700 above a threshold level, which turns the transistor 700 on, and electricity flows from the battery 600 through the collector and emitter of the transistor 700, and to the microcontroller 130.

According to one example, the trigger switch may be configured electronically with the reducible resistor 710 and the transistor 700.

Figure 8:
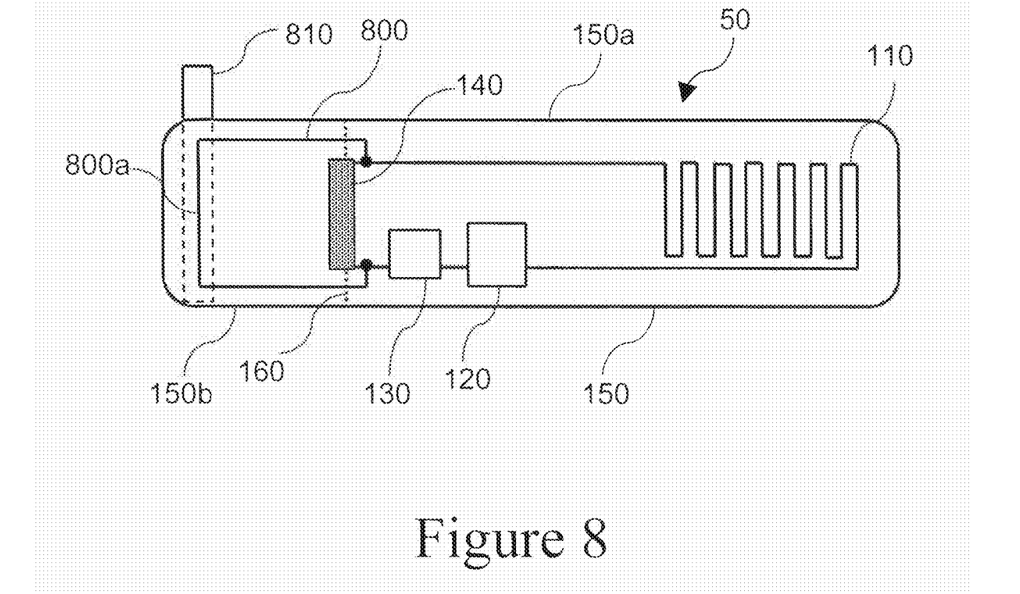
FIG. 8 is a schematic diagram of a tag according to one example.

A RFID tag according to one example is described with reference to FIG. 8. In FIG. 8, a tag 50 further includes an arming section for arming the trigger switch in addition to the constituting elements of the tag 10 according to the first embodiment depicted in FIG. 1.

The arming section includes a bypassing member 800 and a removable tab 810. The bypassing member 800 is connected across the trigger switch 140 so as to bypass the trigger switch 140, and directly connects the microcontroller 130 to the antenna 110. The bypassing member 800 includes a structure that facilitates separation of part 800*a* when the removable tab 810 is removed. The bypassing member 800 may be, for example, an electrical conductor such as a copper wire enclosed inside the enclosure 150 and can be considered as a component of the RFID tag circuitry when included as part of the tag 50.

The removable tab 810 is placed in the separating enclosure 150*b* and attached to part 800*a* of the bypassing member 800 in such a way that the part 800*a* can be removed from the bypassing member 800 when the removable tab 810 is removed from the tag 50. According to certain embodiments, removing the removable tab 810 from the tag 50 is referred to as an arming action.

In one example, before the tag 50 is armed by performing the arming action of removing the removable tab 810 from the tag 50, the tag 50 transmits the tag ID to the RFID reader when an interrogator signal is received, such as in the case of a passive RFID tag of the related art, which allows the tag 50 to be tested prior to arming and using the tag 50.

A user may attach the tag 50 that is unarmed to a target object such as a medicine bottle and subsequently remove the removable tab 810 to arm the tag 50, making the tag 50 ready to be activated via the specific trigger action. Removing the removable tab 810 causes the part 800*a* to be removed from the bypassing member 800 and disconnects electrical conduction of the bypassing member 800. The tag 50 thus armed operates in the same way as the tag 10 according to the first embodiment described with respect to FIGS. 1 and 2. Once the tag 50 is armed, the tag ID will not be returned until the tag 50 is activated by the specific trigger action.

According to this example, the tag 50 may be protected from an accidental activation prior to arming the tag 50. Alternatively, the removable tab 800 may be formed over the tear-line 160 to protect the tag 50 from being accidentally separated at the tear-line 160 prior to being armed. In the present embodiment, the arming section is added to the tag 10 of the first embodiment. Alternatively, any one of the tags 20 to 40 described previously herein may also include the arming section.

Figure 9:
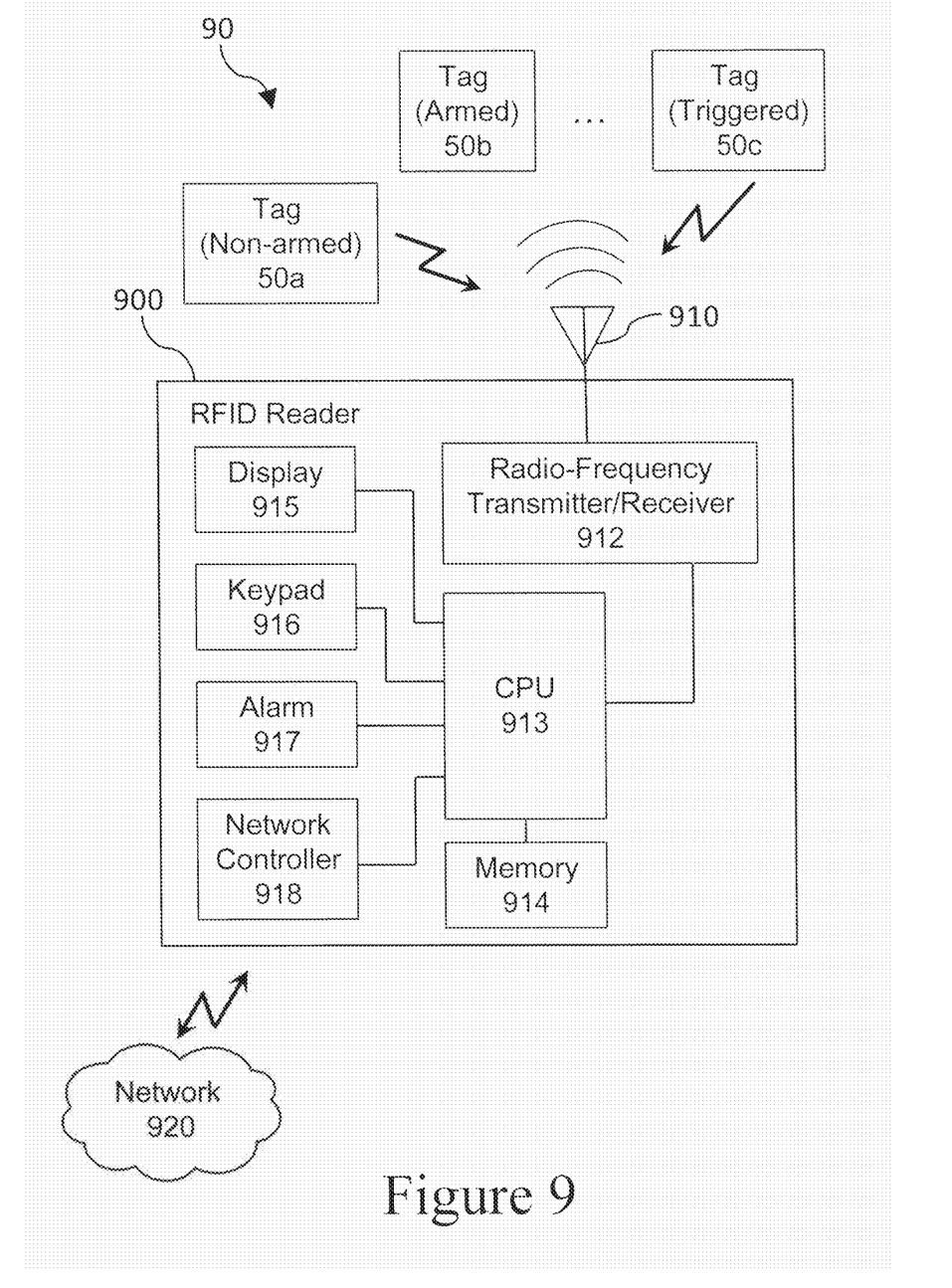
FIG. 9 is a schematic block diagram of a RFID system including a reader and tags according to one example.

A RFID system including a reader and a plurality of tags according to an embodiment is described with reference to FIG. 9 and FIG. 10. In FIG. 9, a RFID system 90 includes a reader 900 and a plurality of tags 50*a*, 50*b*, 50*c*, thru 50*n*, where n represents the total number of tags in the RFID system 90. The RFID system 90 is wirelessly connected to a network 920.

The tags 50 may be tags according to one embodiment described previously with respect to FIG. 8. The tag 50 can be referred to as "unarmed" in the following description, and the tag 50 in this unarmed setting is represented as tag 50*a* in FIG. 9. The tag 50 is armed when the removable tab 810 is removed by a user, which is referred to as an "armed" setting, and the tag 50 in the armed setting is represented as tag 50*b*. In the armed setting, the tag 50 operates in a manner corresponding to the tag 10 of the first embodiment depicted in FIG. 1. The tag 50 is activated when a specific trigger action is applied as is depicted in FIG. 2, which is referred to as a "triggered" setting, and the tag 50 in the triggered setting is represented as tag 50*c*.

The reader 900 includes components such as an antenna 910, a radio-frequency (RF) transmitter/receiver 912, a CPU 913, memory 914, a display 915, a keypad 916, an alarm 917, and a network controller 918. According to certain implementations, the components of the reader 900 can be referred to as reader circuitry when described herein.

The antenna 910 transmits RF interrogator signals generated by the RF transmitter/receiver 912 to interrogate and activate the tags 50*a*-50*c*. The antenna 910 also receives radio-frequency response signals transmitted from the tags 50*a* and 50*c*. The RF transmitter/receiver 912 is coupled to the antenna 910 and generates the interrogator signal modulated according to an input signal from the CPU 913. The RF transmitter/receiver 912 also receives RF-modulated signals returned from the tags 50*a* and 50*c* in response to interrogator signals and demodulates the modulated signals.

The CPU 913 includes processing circuitry that generates interrogator signals and reads returned tag IDs in accordance with a process of for registering and monitoring tags 50 according to the present embodiment. This process is described below in detail with reference to FIG. 10. The process data and instructions may be stored in the memory 914. The process data and instructions may also be stored on a portable storage medium or may be stored remotely. Alternatively, the CPU 913 may be implemented on an FPGA, ASIC, PLD or using discrete logic circuits, as one of ordinary skill in the art would recognize.

The display 915 and the keypad 916 are I/O interfaces for presenting information to a user and receiving input from a user. Specifically, in the RFID system 90, the display 915 is used to inform a user of current setting of each tag 50*a*, 50, and 50*c* during the process for registering and monitoring. In some implementations, the current settings of the tags 50*a*, 50*b*, and 50*c* can also be output to at least one external device, such as a computer and/or mobile device.

The alarm 917 issues an alarm in response to a control signal from the CPU 913. The alarm can be audible, visual, and/or haptic. In the RFID system 90, an alarm is set off when the reader 900 receives tag ID that corresponds to one of the tags 50*b* listed in an armed tag list stored in the memory 914. Issuing the alarm 917 allows a user to be informed of an occurrence of the specific trigger action at the tag 50*c* of the received ID.

The network controller 918 interfaces with a network 920. As can be appreciated, the network 920 can be a public network, such as the Internet, or a private network such as an LAN or WAN network, or any combination thereof and can also include PSTN or ISDN sub-networks. The network 920 can also be wired, such as an Ethernet network, or can be wireless such as a cellular network including EDGE, 3G and 4G wireless cellular systems. The wireless network can also be WiFi, Bluetooth, or any other wireless form of communication that is known.

Figure 10:
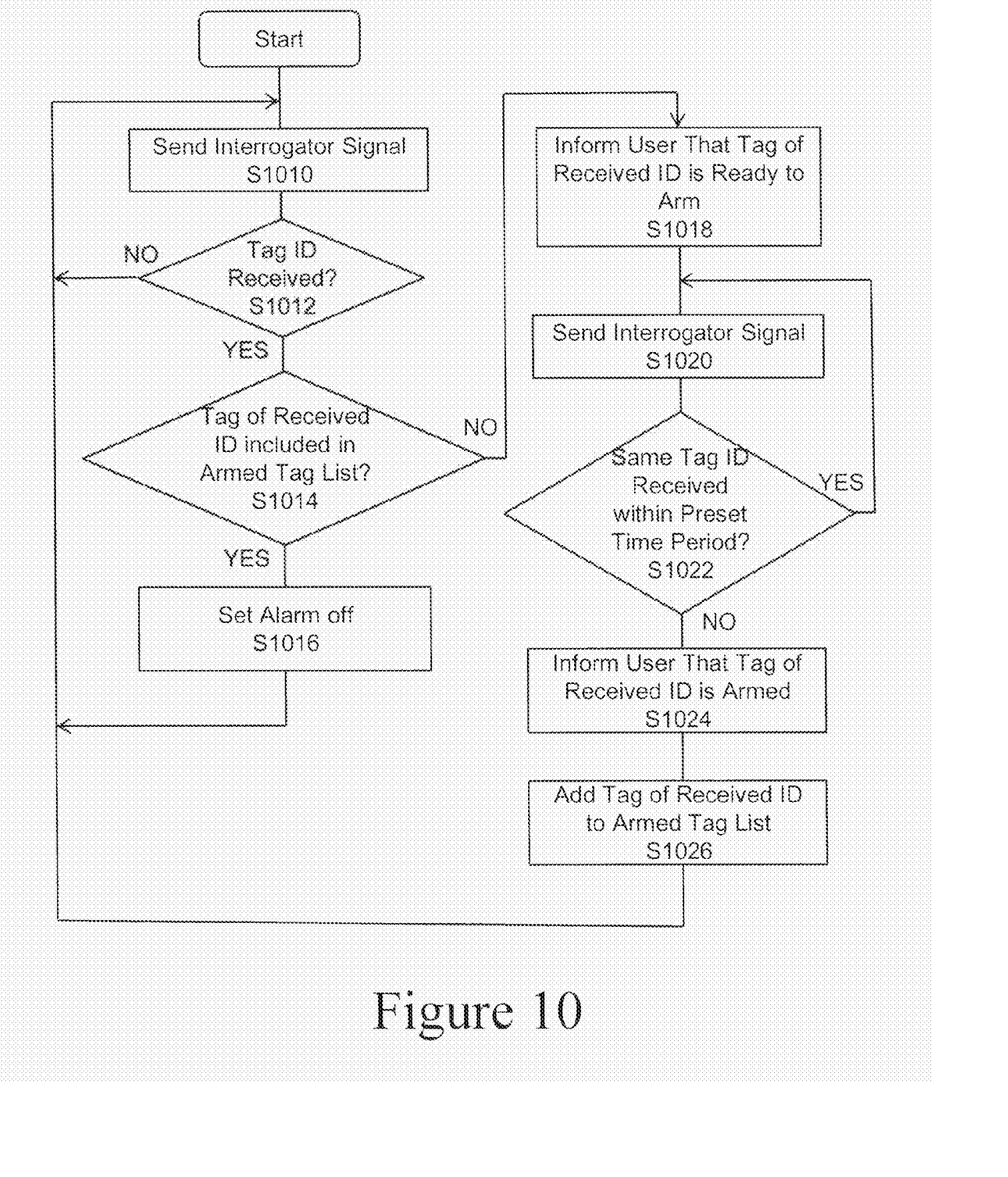
FIG. 10 is an algorithmic flow chart for registering and monitoring the tags in the RFID system according to one example.

FIG. 10 is an algorithmic flow chart of the process for registering and monitoring the tags 50 in the RFID system 90.

The process starts and runs continuously once the reader 900 is turned on. In this process, at step S1010, an interrogator signal is transmitted from the reader 900.

As described previously, each tag 50 is a passive type RFID tag that can be armed by a user and triggered by a specific trigger action. Each tag 50 may be in the unarmed setting (tag 50*a*), armed setting (tag 50*b*), or triggered setting (tag 50*c*). In the RFID system 90, the unarmed tags 50*a*, armed tags 50*b*, and/or triggered tags 50*c* may be simultaneously present.

At step S1012, the processing circuitry of the reader 900 determines whether the reader 900 has received a tag ID in response to the interrogator signal. Steps 1010 and 1012 are repeated until any tag ID is received.

When tag ID is received by the reader, resulting in a "yes" at step S1012, then step S1014 is performed, and the processing circuitry of the reader 900 determines whether or not the received tag ID is included in an armed tag list. In one implementation, the armed tag list is a data file stored in the memory 914 and includes tag IDs of the tags 50b that are determined as armed in the following steps.

When the received tag ID is included in the armed tag list, resulting in a "yes" at step S1014, then step S1016 is performed, and the alarm 917 is activated. As described previously, the armed tag 50b does not return the corresponding tag ID since the trigger switch 140 interrupts electrical power to the microcontroller 130 until the armed tag 50b is activated via the specific trigger action. Receiving the tag ID from the armed tag 50b means that the armed tag 50b has been triggered.

When the received tag ID is not included in the armed tag list, resulting in a "no" at step S1014, then the process proceeds to step S1018 and the processing circuitry of the reader 900 outputs a notification via the display 915 to inform the user, that the tag 50 corresponding to the received tag ID is the unarmed tag 50a that is ready to arm. Receiving the tag ID of the unarmed tag 50a allows testing of electronic circuitry and physical integrity of the unarmed tag 50a. Receiving the tag ID of the unarmed tag 50a also allows automatic registration of a new unarmed tag 50a into the RFID system 90.

At step S1020, after informing a user via the display 915 that the tag 50a corresponding to the received tag ID is ready to arm, another interrogator signal is transmitted from the reader 900. Subsequently, at step S1022, it is determined whether the same tag ID is received within a preset time period after transmitting the interrogator signal. The preset time period may be longer than an average response time of the tag 50 to an interrogator signal. Steps 1020 and 1022 are repeated until the preset time period has elapsed without receiving the same tag ID.

As described previously, the unarmed tag 50a returns its corresponding tag ID in response to an interrogator signal, but when the unarmed tag 50a is armed, the tag ID is no longer returned. Thus, absence of the tag ID that has been previously received may mean that the unarmed tag 50a has been armed by a user who was informed at step S1018 that the unarmed tag 50a corresponding to the received ID was ready to arm via the display 915.

When the same tag ID is not received within the preset time period, resulting in a "no" at step S1022, the process proceeds to step S1024 and informs a user, using the display 915, that the tag 50a corresponding to the received tag ID is now armed. At step S1026, the tag 50b corresponding to the received tag ID is added to the armed tag list stored in the memory 914 (step S1026). The process returns to step S1010 and the foregoing steps are repeated.

Alternatively, the process may further include a step for removing the triggered tag 50c identified at step S1014 from the armed tag list. In one embodiment, the tag 50 in which the arming section is added to the tag 10 of the first embodiment is used. Alternatively, any one of the tags 20 to 40 described above may be used with the arming section in the RFID system 90. In one implementation, only the tags 50 are used in the RFID system 90. Alternatively, the RFID system 90 can include different types of tags combining any one of the tags 20 to 40 described above with the arming section described previously herein.

The RFID system 90 may be used, for example, for detecting an occurrence of a predetermined event such as opening of a target object sealed by the tags 50 in a location where a plurality of target objects sealed by the tags 50 are stored.

The tags 10-50 and the RFID system 90 according to the embodiments have applications in many industries including healthcare and other industries that may require monitoring mechanical or chemical actions applied on certain items. For example, healthcare organizations can place the tags 10-50 on drug bottles used in operating rooms. When one of those bottles is opened, the tag is triggered and then a reader of the RFID system receives the information that this bottle has been opened. Besides being used for inventory, this application is also important for safety, as healthcare providers can be notified if the medication is expired as soon as the bottle is opened.

Another application is in monitoring narcotic medication cabinets. A tag according to one of the foregoing embodiments can be attached to a door of a cabinet, and when the door is opened, the tag notifies the RFID reader of an occurrence of the specific trigger action. This can be a cost effective method for accurately monitoring and documenting the medications used as well as inventorying the used medications and consumables in clinical areas.

In other fields, tags according to one of the foregoing embodiments may be useful in monitoring sensitive information that is stored in cabinets or even folders. For instance, the tag can be attached to the inside of a folder, and when the folder is opened, the tag notifies the RFID reader of the opening action. This application can also be used in non-confidential office communications. The tag can be attached to envelopes, and when the envelop is opened, the tag notifies the RFID reader of the action, which in turn, can be sent to the sender, that the envelope has been opened, with providing the exact date/time.

Thus, the foregoing discussion discloses and describes merely exemplary embodiments. As will be understood by those skilled in the art, the present invention may be embodied in other specific forms without departing from the spirit or essential characteristics thereof. Various disclosures and embodiments described herein can be combined such that multiple varied trigger actions could trigger transmission of signals from a tag. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The above disclosure also encompasses the embodiments listed below.

(1) A radio-frequency identification (RFID) system including: at least one tag having tag circuitry configured to detect activation of a trigger switch resulting from a specific trigger action, provide electrical power to the tag circuitry when the specific trigger action is performed, and transmit an identification data signal including identification data for the at least one tag when the trigger switch is activated and in response to receiving an interrogator signal, and an enclosure surrounding the tag circuitry including a separating end detachably attached to a primary end, wherein the specific trigger action is a separation of the separating end from the primary end; and a RFID reader having reader circuitry configured to determine that the at least one tag is unarmed based on a presence of the identification data signal in response to the interrogator signal and an absence of the tag identification data on an armed tag list, determine that the at least one tag is armed based on an absence of the identification data signal in response to the interrogator signal for a preset period of time, and determine that the at least one tag is triggered based on the presence of the identification data signal in response to the interrogator signal and the presence of the tag identification data on the armed tag list.

(2) The system of (1), wherein the trigger switch includes an electrical isolation material disposed between a first electrode and a second electrode that interrupts the electrical power to the tag circuitry prior to performance of the specific trigger action.

(3) The system of (1) or (2), wherein the tag circuitry is further configured to determine that the trigger switch is activated when the first electrode and the second electrode make contact upon removal of the electrical isolation material from the trigger switch when the specific trigger action is performed.

(4) The system of any one of (1) to (3), wherein the electrical isolation material includes an electrical isolation filament that is removed from the trigger switch when the separating end of the enclosure is detached from the primary end of the enclosure when the specific trigger action is performed.

(5) The system of any one of (1) to (4), wherein the electrical isolation material is dissolved via a chemical action when the trigger switch is exposed to a predetermined chemical substance.

(6) The system of any one of (1) to (5), wherein the electrical isolation material includes electrical isolation fluid that is pushed away from the first electrode and the second electrode when the trigger switch is bent.

(7) The system of any one of (1) to (6), wherein the tag circuitry further comprises:
a magnet surrounded by a coil, wherein the specific trigger action results in relative motion between the magnet and the coil that provides the electrical power to the tag circuitry.

(8) The system of any one of (1) to (7), wherein the tag circuitry is further configured to transmit the identification data when the trigger switch is activated and prior to receiving the interrogator signal.

(9) The system of any one of (1) to (8), wherein the tag circuitry includes a reducible resistor connected to a NPN transistor to provide the electrical power to the tag circuitry when the specific trigger action is performed.

(10) The system of any one of (1) to (9), wherein the reducible resistor is made of a conductive material and an insulating material wherein a resistance of the reducible resistor is based on a ratio of conductive material resistance to insulating material resistance.

(11) The system of any one of (1) to (10), wherein the reducible resistor includes a removable end that is separated from reducible resistor when the specific trigger action is performed.

(12) The system of any one of (1) to (11), wherein the tag circuitry is further configured to detect that the removable end of the reducible resistor has been removed when a current through the NPN transistor is greater than a predetermined threshold.

(13) The system of any one of (1) to (12), wherein the tag circuitry includes an electrical conductor to bypass the trigger switch when the at least one tag is unarmed.

(14) The system of any one of (1) to (13), wherein the at least one tag further comprises: an arming tab connected to a removable end of the electrical conductor wherein the arming tab and the removable end of the electrical conductor are separated from the tag when an arming action is performed.

(15) The system of any one of (1) to (14), wherein the reader circuitry is further configured to add the identification data of the at least one tag to the armed tag list when the identification data signal as absent for the preset period of time.

(16) The system of any one of (1) to (15), wherein the reader circuitry is further configured to output an alarm when the identification data signal is received from the at least one tag and the identification data for the at least one tag is present on the armed tag list.

(17) The system of any one of (1) to (16), wherein the reader circuitry is further configured to determine that the preset period of time is longer than an average response time for the at least one tag.

(18) The system of any one of (1) to (17), wherein the reader circuitry is further configured to remove the identification data of the at least one tag from the armed tag list when the at least one tag is triggered.

19. A RFID tag including: tag circuitry configured to detect activation of a trigger switch resulting from a specific trigger action, provide electrical power to the tag circuitry when the specific trigger action is performed, and transmit an identification data signal including identification data for the at least one tag when the trigger switch is activated and in response to receiving an interrogator signal; and an enclosure surrounding the tag circuitry including a separating end detachably attached to a primary end, wherein the specific trigger action is the separation of the separating end from the primary end.

The invention claimed is:

1. A radio-frequency identification (RFID) system comprising:
at least one tag having
tag circuitry configured to
detect activation of a trigger switch resulting from a specific trigger action,
provide electrical power to the tag circuitry when the specific trigger action is performed, and
transmit an identification data signal including identification data for the at least one tag when the trigger switch is activated and/or in response to receiving an interrogator signal, and
an enclosure surrounding the tag circuitry including a separating end detachably attached to a primary end, wherein the specific trigger action is a separation of the separating end from the primary end; and
a RFID reader having reader circuitry configured to
determine that the at least one tag is unarmed based on a presence of the identification data signal in response to the interrogator signal and an absence of the tag identification data on an armed tag list,
determine that the at least one tag is armed based on an absence of the identification data signal in response to the interrogator signal for a preset period of time, and
determine that the at least one tag is triggered based on the presence of the identification data signal in response to the interrogator signal and the presence of the tag identification data on the armed tag list.

2. The system of claim 1, wherein the trigger switch includes an electrical isolation material disposed between a first electrode and a second electrode that interrupts the electrical power to the tag circuitry prior to performance of the specific trigger action.

3. The system of claim 2, wherein the tag circuitry is further configured to determine that the trigger switch is activated when the first electrode and the second electrode make contact upon removal of the electrical isolation material from the trigger switch when the specific trigger action is performed.

4. The system of claim 3, wherein the electrical isolation material includes an electrical isolation filament that is removed from the trigger switch when the separating end of the enclosure is detached from the primary end of the enclosure when the specific trigger action is performed.

5. The system of claim 3, wherein the electrical isolation material is dissolved via a chemical action when the trigger switch is exposed to a predetermined chemical substance.

6. The system of claim 3, wherein the electrical isolation material includes electrical isolation fluid that is pushed away from the first electrode and the second electrode when the trigger switch is bent.

7. The system of claim 1, wherein the tag circuitry further comprises:
a magnet surrounded by a coil,
wherein the specific trigger action results in relative motion between the magnet and the coil that provides the electrical power to the tag circuitry.

8. The system of claim 1, wherein the tag circuitry is further configured to transmit the identification data when the trigger switch is activated and prior to receiving the interrogator signal.

9. The system of claim 1, wherein the tag circuitry includes a reducible resistor connected to a NPN transistor to provide the electrical power to the tag circuitry when the specific trigger action is performed.

10. The system of claim 9, wherein the reducible resistor is made of a conductive material and an insulating material wherein a resistance of the reducible resistor is based on a ratio of conductive material resistance to insulating material resistance.

11. The system of claim 10, wherein the reducible resistor includes a removable end that is separated from reducible resistor when the specific trigger action is performed.

12. The system of claim 11, wherein the tag circuitry is further configured to detect that the removable end of the reducible resistor has been removed when a current through the NPN transistor is greater than a predetermined threshold.

13. The system of claim 1, wherein the tag circuitry includes an electrical conductor to bypass the trigger switch when the at least one tag is unarmed.

14. The system of claim 13, wherein the at least one tag further comprises:
an arming tab connected to a removable end of the electrical conductor wherein the arming tab and the removable end of the electrical conductor are separated from the tag when an arming action is performed.

15. A RFID tag comprising:
tag circuitry configured to
detect activation of a trigger switch resulting from a specific trigger action,
provide electrical power to the tag circuitry when the specific trigger action is performed, and
transmit an identification data signal including identification data for the at least one tag when the trigger switch is activated and/or in response to receiving an interrogator signal; and
an enclosure surrounding the tag circuitry including a separating end detachably attached to a primary end, wherein the specific trigger action is the separation of the separating end from the primary end,
wherein the trigger switch includes an electrical isolation material disposed between a first electrode and a second electrode that interrupts the electrical power to the tag circuitry prior to performance of the specific trigger action,
wherein the tag circuitry is further configured to determine that the trigger switch is activated when the first electrode and the second electrode make contact upon removal of the electrical isolation material from the trigger switch when the specific trigger action is performed.

16. The RFID tag of claim 15, wherein the electrical isolation material includes an electrical isolation filament that is removed from the trigger switch when the separating end of the enclosure is detached from the primary end of the enclosure when the specific trigger action is performed.

17. The RFID tag of claim 15, wherein the electrical isolation material is dissolved via a chemical action when the trigger switch is exposed to a predetermined chemical substance.

18. The RFID tag of claim 15, wherein the electrical isolation material includes electrical isolation fluid that is pushed away from the first electrode and the second electrode when the trigger switch is bent.

19. The RFID tag of claim 15, wherein the tag circuitry further comprises:
a magnet surrounded by a coil,
wherein the specific trigger action results in relative motion between the magnet and the coil that provides the electrical power to the tag circuitry.

20. The RFID tag of claim 15, wherein the tag circuitry is further configured to transmit the identification data when the trigger switch is activated and prior to receiving the interrogator signal.

* * * * *